350-376 SR
XR 3,506,974
40290
SEARCH ROOM

April 14, 1970 R. C. LE CRAW ET AL 3,506,974

MAGNETIC MEMORY IMPLEMENTATION

Filed April 11, 1967

INVENTORS
R. C. LE CRAW
R. C. SHERWOOD
R. WOLFE
BY Herbert M Shapiro
ATTORNEY

3506974
OR IN 365/11

United States Patent Office 3,506,974
Patented Apr. 14, 1970

3,506,974
MAGNETIC MEMORY IMPLEMENTATION

Roy Conway Le Craw, Madison, and Richard C. Sherwood and Raymond Wolfe, New Providence, N.J., assignors to Bell Telephone Laboratories, Incorporated, Murray Hill and Berkeley Heights, N.J., a corporation of New York Filed Apr. 11, 1967, Ser. No. 629,993
Int. Cl. G11b 7/02; G11c 13/04
U.S. Cl. 340—174 10 Claims

ABSTRACT OF THE DISCLOSURE

Single wall (bubble) domains of reverse magnetization are written into a magnetically initialized sheet of orthoferrite by locally raising the temperature of the sheet to a characteristic temperature at which flux reorients from a direction normal to the plane of the sheet to a direction in the plane of the sheet and by providing a suitable magnetic field in a direction normal to the plane of the sheet as the temperature is again reduced. A proper selection of the magnetic material permits a characteristic temperature controllably close to the ambient temperature enabling switching in the absence of local heating.

FIELD OF THE INVENTION

This invention relates to magnetic memories and, more particularly, to such memories employing magnetic materials having preferred directions for flux orientation normal to the plane of a sheet of the material.

BACKGROUND OF THE INVENTION

Copending application Ser. No. 579,931, filed Sept. 16, 1966 for A. H. Bobeck, U. F. Gianola, R. C. Sherwood, and W. Shockley now Patent No. 3,460,116 discloses a magnetic memory in which single wall reverse magnetized domains are provided in a magnetically initialized (saturated) sheet of a material having a preferred direction of magnetization normal to the sheet. Such sheets operate as memories conveniently by selectively moving to an information indicative position a single wall reverse magnetized domain stored in each bit location. Movement of a domain in such a material is in response to a properly poled relatively low (propagation) field displaced from the domain, but the provision of such domains initially is relatively difficult because of the localized high (nucleation) fields required.

An object of this invention is to provide a new and novel means for writing signal wall domains into a memory of the above-identified type.

SUMMARY OF THE INVENTION

The invention is based on the realization that materials, such as the rare earth orthoferrites, are characterized by a temperature at which the magnetization therein changes spontaneously (90°) from a direction normal to the plane of a sheet of a material to a direction in the plane of the sheet. In accordance with an embodiment of this invention, a laser beam is directed at a selected position in a sheet of an orthoferrite for elevating the temperature of the material at that position to the characteristic temperature. A field is applied of a magnitude and in a direction to rotate flux upward out of the sheet or downward into the sheet of material depending on the polarity of the field and the initial magnetization state of the material. Single wall domains are provided.

A proper selection of the material employed enables the provision of a characteristic temperature controllably close to the ambient temperature providing control over the field required for switching.

DETAILED DESCRIPTION

Figure 1:
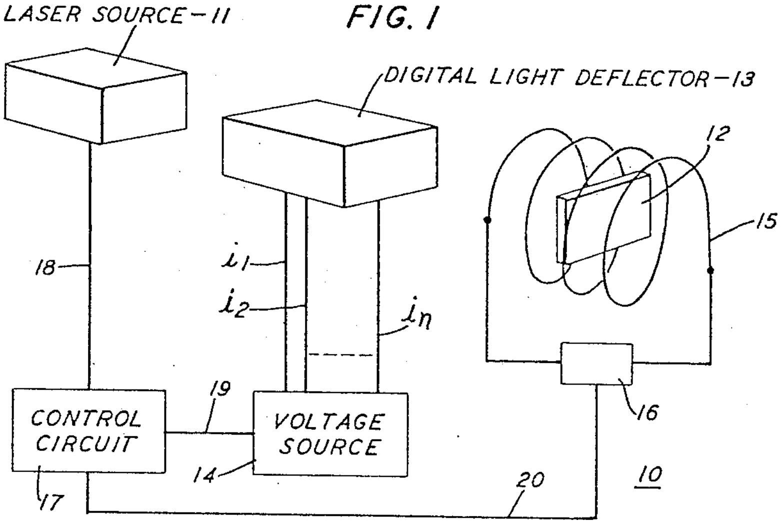
FIG. 1 is a schematic illustration of an arrangement for providing single wall domains in accordance with this invention.

FIG. 1 shows an illustrative arrangement 10, in accordance with this invention, organized for writing single wall domains into a memory plane. The arrangement comprises a laser source 11 directed at a sheet 12 of orthoferrite through a digital light deflector 13. Digital light deflector 13 includes a plurality of inputs $i_1, i_2, \ldots, i_n$, to consecutive stages therein, shown connected to a coded voltage source 14.

A coil 15 encompasses sheet 12 in an orientation to provide a field normal to sheet 12 when activated. Coil 15 is connected across a current source 16.

Laser source 11, voltage source 14, and current source 16 are connected to a control circuit 17 by means of conductors 18, 19, and 20. The various sources, circuits, and deflectors may be any such elements capable of operating in accordance with this invention.

Figure 2:
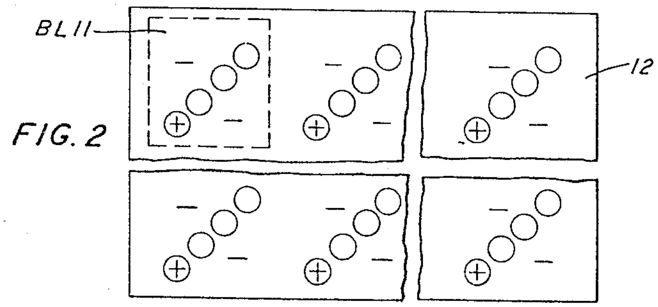
FIG. 2 is a schematic illustration of a sheet of material including single wall domains.

FIG. 2 shows a view of sheet 12 showing four circles representing four possible positions for a single wall domain in each bit location of a memory plane as shown in copending application Ser. No. 579,904, filed Sept. 16, 1966 for A. H. Bobeck. Such a memory requires the storage of a single wall domain, initially, in each bit location at a position designated by the plus sign. The plus sign is to indicate a magnetized domain with flux directed toward the reader as viewed in FIG. 2. The remainder of the film is negative indicating flux directed away from the reader.

The utility of moving the single wall domain and the implementation for so moving the domain are described in the last-mentioned copending application. We are concerned here primarily with a technique for providing single wall domains in the positions indicated by the plus signs. This is accomplished by positioning sheet 12, by means not shown, such that the positions of the plus signs correspond to different settings on the inputs of the digital light deflector.

Figures 3, 4:
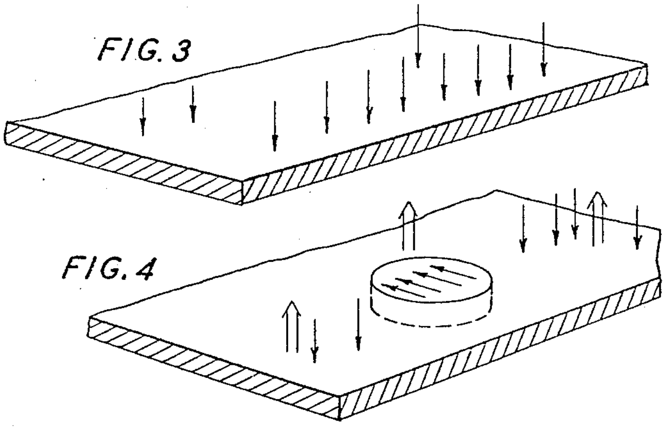
FIGS. 3, 4, and 5 are schematic illustrations of a portion of the sheet of FIG. 2 during a write operation.

Consider what happens when a selected position in sheet 12 is irradiated by a light beam such that the temperature of that position is elevated to the characteristic temperature at which flux becomes oriented in the plane of the sheet rather than oriented normal to the sheet. FIG. 3 shows an enlargement of a portion of a bit location BL11 shown in FIG. 2 in which a single wall domain is to be provided. Flux is indicated to be directed downward (into the sheet) as viewed in FIG. 3.

The laser beam is directed through deflector 13 under the control of control circuit 17 to elevate the temperature of the encircled portion of bit location shown in FIG. 4. When the temperature of that portion reaches the characteristic temperature, flux in that portion reorients to a direction in the plane of the sheet as represented by the arrows directed to the left as view in FIG. 4.

Source 16 now applies a current to coil 15 under the control of control circuit 17 and the light beam is extinguished concurrently. The current in coil 15 is taken to be of a polarity to generate a field directed upward as indicated by the double arrows in FIG. 4. Such a field is typically far below the value necessary to switch flux in unheated portions of sheet 12 but sufficient to tip flux in the heated portion into a direction opposite to that of the remainder of the sheet. Demagnetizing fields provided by a magnetically initialized film tend to aid such a field resulting in a further lowering in the requisite strength of the field.

Figure 5:
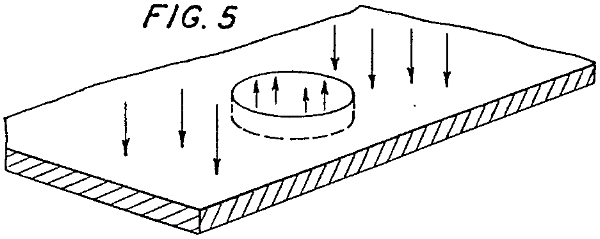

The current in coil 15 is terminated and a single wall domain as shown in FIG. 5 results. Such a domain corresponds to that domain in bit location BL11 of FIG. 2 demarcated by the plus sign.

The writing operation may be repeated for consecutive bit locations by programming source 14 to generate consecutive addresses for those bit locations. The magnetic field applied in each consecutive operation only temporarily enlarges domains previously provided. Alternatively, domains may be written into all the addresses simultaneously by a reticular lens system such as is described in copending application Ser. No. 437,770, filed Mar. 8, 1965 for W. J. Tabor, now Patent 3,438,692. Further, the entire sheet may be maintained at a corresponding characteristic temperature and a magnetic field applied selectively, conveniently by means of an appropriate wiring pattern.

Several of the orthoferrites have been observed, experimentally, to demagnetize spontaneously at temperatures slightly different (typically a few degrees) from corresponding characteristic temperatures defined above. Operation in accordance with this invention is permitted at such slightly different temperatures and in the range of temperatures between those temperatures and the corresponding characteristic temperatures.

Various materials are useful in accordance with this invention. Specifically, suitable materials are described in the Journal of Applied Physics, vol. 30, No. 2, pp. 217–225 and in the Physical Review Letters, vol. 1, No. 1, p. 3, July 1, 1958. The materials includes end members in a set of materials of the general form $X_aY_{1-a}FeO_3$ (orthoferrites) where X and Y are either yttrium or a rare earth element.

Each such material is characterized by a different temperature at which flux reorients. The following chart identifies additional representative mixed orthoferrite materials and the corresponding characteristic temperatures. It will be noted from the chart that materials having temperatures below the convenient room temperature ambient may be chosen. In such cases, it may be necessary to cool, rather than heat, the material selectively. A grid of well known thermoelectric elements may be used to this end. Alternatively, the entire sheet may be cooled (most conveniently down to −25° C.) by a thermoelectric cooler and selected positions heated as described before.

| Material: | Temperature |
|---|---|
| $Er_aSm_{(1-a)}FeO_3$ | Variable from ≈500° K. to ≈ 100° K. depending on composition. |
| $Gd_aSm_{(1-a)}FeO_3$ | Variable from ≈500° K. to <77° K. depending on composition. |
| $Y_aSm_{(1-a)}FeO_3$ | Variable from ≈500° K. to <77° K. depending on composition. |

The subscripts in the chart indicate atomic fractions.

It is important to bear in mind that the crystal orientation of a sheet of material in accordance with this invention is selected to provide a flux orientation normal to the plane of the sheet over the selected range of operating temperatures. Thus, for example, where heating is required to elevate a temperature from the ambient to the characteristic temperature, the (normal) crystal orientation is along the *a* axis. Where cooling is required, the orientation is along the *c* axis.

It a sheet of material in accordance with this invention is chosen to exhibit the reorientation of the preferred direction of flux at a characteristic temperature which approximates the ambient temperature, flux switching may be made to occur solely in response to magnetic switching fields. In such cases, it is clear, the (normal) anisotropy of the material is controllably low and the requisite switching (and/or propagation) fields are correspondingly low. Further, by selecting the proportions of constituents X and Y in the materials employed, a characteristic temperature may be provided controllably different from the ambient temperature. Small differences between the characteristic temperature and the ambient, then, permit controllably low (normal) anisotropy and correspondingly low switching fields in the absence of local heating. Increasingly larger differences between a characteristic temperature and the ambient temperature are accompanied by higher anisotropy and, thus, higher requisite switching fields. The difference between a characteristic temperature and the ambient temperature typically is greater than the difference between a characteristic temperature and the associated temperature at which the material demagnetizes.

Samarium (Sm) is a necessary constituent in any mixed orthoferrite with a characteristic temperature in the neighborhood of normal room temperature and higher.

In one specific example, a sheet of essentially single crystal $Gd_{.4}Sm_{.6}FeO_3$ has a characteristic temperature of about 50° C. (323° K.) which is provided selectively in a portion of a sheet of material via a (Nd–YAG) laser beam having an energy of one millijoule and a duration of less than a millisecond. Typically, a magnetic field of less than five oersteds is sufficient to write a single wall domain in an illuminated position for a representative material such as $Gd_{.4}Sm_{.6}FeO_3$. This is to be contrasted with over 500 oersteds usually required in the absence of such heating. The temperature at which spontaneous demagnetization occurs in this material is about 40° C.

The materials are generally in the form of single crystal sheets (about a few mils thick). Polycrystalline sheets having the individual crystallites properly oriented before being fixed in position, for example, by sintering, are also useful.

Although a laser provides a high degree of control in the selective heating step, other means may be used as well. For example, a xenon flash bulb may be used.

Shuttering of the laser beam responsive to information bearing signals permits further flexibility. For example, the presence and absence of a single wall domain at a selected location in a magnetic sheet is controlled by passing and shuttering the beam, respectively, in order to represent first and second binary values. Operation in this mode is similar to that disclosed in J. T. H. Chang-J. F. Dillon, Jr.-U. F. Gianola, Patent 3,164,816, issued Jan. 5, 1965. Alternatively, the presence and absence of the magnetic field applied as the temperature of the heated portion of a magnetic sheet similarly determines the presence and absence of a single wall domain at a selected position.

What has been described is considered to be only illustrative of the principles of this invention. Accordingly, various modifications may be made therein by one skilled in the art without departing from the scope and spirit of the invention.

What is claimed is:

1. A magnetic device comprising a sheet of a material having a preferred direction of magnetization out of the plane of said sheet and being capable of having a single wall domain stored therein, said material having a characteristic temperature at which flux reorients from said position out of said plane to a position in said plane, means selectively changing the temperature of a portion of said material from an ambient temperature to about said characteristic temperature, and means changing the temperature of said portion from about said characteristic temperature to said ambient temperature in the presence of a magnetic field of a strength and in an orientation to form a single wall domain.

2. A magnetic memory comprising a sheet of a material having a preferred direction of magnetization substantially normal to the plane of said sheet and being capable of having single wall domains moved therein in response to a field in excess of a propagation threshold, said material having a characteristic temperature at which flux reorients from a position substantially normal to said plane to a position in said plane, means selectively elevating the temperature of a portion of said sheet to said characteristic temperature, and means reducing the temperature of said portion in the presence of a magnetic field of a strength and in an orientation to form a single wall domain.

3. A magnetic memory in accordance with claim 2 wherein said sheet comprises polycrystalline orthoferrite of the general form $X_aY_{1-a}FeO_3$.

4. A magnetic memory in accordance with claim 2 wherein said sheet comprises single crystal orthoferrite of the general form $X_aY_{1-a}FeO_3$.

5. A magnetic memory in accordance with claim 4 wherein said sheet comprises $X_aSm_{1-a}FeO_3$.

6. A magnetic memory in accordance with claim 5 wherein said means elevating the temperature of said portion comprises a laser.

7. A device designed to operate at a preselected ambient temperature, said device comprising an orthoferrite material including the constituents $X_a$ and $Sm_{1-a}$ where $a$ defines the atomic fraction of the constituents, the proportion $a/1-a$ of the ingredients X and Sm in the material determining a characteristic temperature at which the prefered direction of magnetization in said material spontaneously reorients from a first to a second direction, said proportion being chosen such that said characteristic temperature approximates but still different from said ambient temperature, together with means selectively providing a magnetic field in said first direction.

8. A device in accordance with claim 7 wherein X is selected from a group consisting of yttrium and the rare earth elements.

9. A device in accordance with claim 8 wherein said ambient temperature is about room temperature.

10. A device comprising a body of material of the form $X_aY_{1-a}FeO_3$ having a characteristic temperature at which the preferred direction of flux spontaneously reorients to a direction 90 degrees from the direction in which flux is oriented at temperatures different from said characteristic temperature together with means applying a magnetic field across at least a portion of said body when said portion is at a temperature approximating but still different from said characteristic temperature.

References Cited

UNITED STATES PATENTS 3,164,816 1/1965 Chang et al. ---------- 340—174

BERNARD KONICK, Primary Examiner

G. M. HOFFMAN, Assistant Examiner

U.S. Cl. X.R.

340—174.1